(12) United States Patent
Samarasinghe et al.

(10) Patent No.: US 10,808,874 B2
(45) Date of Patent: Oct. 20, 2020

(54) INLINE FLUID DAMPER DEVICE

(71) Applicant: General Electric Company, Schenectady, NY (US)

(72) Inventors: Ramal Janith Samarasinghe, Niskayuna, NY (US); Nicholas Arthur Magina, Niskayuna, NY (US); Andrew Wickersham, Niskayuna, NY (US); Arin Cross, Niskayuna, NY (US); Fei Han, Niskayuna, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 83 days.

(21) Appl. No.: 15/827,587

(22) Filed: Nov. 30, 2017

(65) Prior Publication Data
US 2019/0162350 A1  May 30, 2019

(51) Int. Cl.
| | |
|---|---|
| *F16L 55/04* | (2006.01) |
| *F16L 55/05* | (2006.01) |
| *F02M 37/00* | (2006.01) |
| *F16L 11/26* | (2006.01) |
| *F15D 1/00* | (2006.01) |

(52) U.S. Cl.
CPC ....... *F16L 55/041* (2013.01); *F02M 37/0041* (2013.01); *F15D 1/00* (2013.01); *F16L 11/26* (2013.01); *F16L 55/05* (2013.01); *F02M 2200/315* (2013.01)

(58) Field of Classification Search
CPC ......... F16L 55/041; F16L 11/26; F16L 55/05; F02M 37/0041; F02M 2200/315; F15D 1/00

USPC .............................................. 138/26, 42, 44
See application file for complete search history.

(56) References Cited

U.S. PATENT DOCUMENTS

| | | | | |
|---|---|---|---|---|
| 1,236,987 | A * | 8/1917 | Schmitt ..................... | F01N 1/06 181/253 |
| 1,329,559 | A | 2/1920 | Tesla | |
| 1,505,893 | A * | 8/1924 | Hunter ..................... | F01N 1/12 181/253 |

(Continued)

OTHER PUBLICATIONS

Bothien et al., "A Novel Damping Device for Broadband Attenuation of Low-Frequency Combustion Pulsations in Gas Turbines", Journal of Engineering for Gas Turbines and Power, vol. 136, Issue: 4, pp. 1-9, Dec. 10, 2013.

*Primary Examiner* — Craig M Schneider
*Assistant Examiner* — David R Deal
(74) *Attorney, Agent, or Firm* — The Small Patent Law Group LLC; Mary D. Lawlor

(57) ABSTRACT

An inline fluid damper device comprises a flow-through conduit configured to be placed inside a larger exterior conduit through which a fluid flows. The flow-through conduit is elongated and extending around a center axis. The damper device also comprising an indirect flow conduit coupled with the flow-through conduit. The indirect flow conduit is also configured to be placed inside the larger exterior conduit. The flow-through conduit and the indirect flow conduit are configured to dampen one or more flow fluctuations or pressure fluctuations in the fluid flowing in the larger exterior conduit by dividing the fluid into a first portion that flows along the center axis through the flow-through conduit and a second portion that concurrently flows outside of the flow-through conduit along the center axis and along a different direction.

2 Claims, 14 Drawing Sheets

(56) References Cited

U.S. PATENT DOCUMENTS

| | | | |
|---|---|---|---|
| 1,612,584 A * | 12/1926 | Hunter | F01N 1/12 181/279 |
| 1,782,396 A * | 11/1930 | Arthur | F01N 1/12 181/280 |
| 2,359,365 A * | 10/1944 | Katcher | F01N 1/12 181/280 |
| 3,235,003 A | 2/1966 | Smith | |
| 3,700,069 A * | 10/1972 | Rausch | F01N 1/06 181/227 |
| 3,913,703 A * | 10/1975 | Parker | F01N 1/06 181/206 |
| 3,963,092 A * | 6/1976 | Soares | F01N 1/12 181/268 |
| 4,050,539 A * | 9/1977 | Kashiwara | F01N 1/06 181/280 |
| 4,683,978 A * | 8/1987 | Venter | F01N 1/12 181/258 |
| 5,076,782 A | 12/1991 | Campbell et al. | |
| 5,685,157 A | 11/1997 | Pandalai et al. | |
| 6,038,862 A | 3/2000 | Melman et al. | |
| 6,514,040 B2 | 2/2003 | Lewis et al. | |
| 6,948,479 B1 | 9/2005 | Raney et al. | |
| 7,117,973 B2 * | 10/2006 | Graefenstein | F01N 1/06 181/253 |
| 7,600,607 B2 | 10/2009 | Sullivan | |
| 8,312,727 B2 | 11/2012 | Bishara et al. | |
| 9,074,565 B2 | 7/2015 | Ramamurthy et al. | |
| 9,316,156 B2 | 4/2016 | Matsuyama et al. | |
| 9,500,108 B2 * | 11/2016 | Brown | F01N 1/24 |
| 2005/0011700 A1 * | 1/2005 | Dadd | F01N 1/06 181/279 |
| 2015/0113991 A1 | 4/2015 | Tonon et al. | |
| 2016/0177836 A1 | 6/2016 | Wickstrom et al. | |
| 2016/0201530 A1 * | 7/2016 | Brown | F01N 1/24 181/227 |

* cited by examiner

US 10,808,874 B2

INLINE FLUID DAMPER DEVICE

FIELD

The subject matter described herein relates to devices for attenuating fluid fluctuations.

BACKGROUND

An assembly, such as a gas turbine engine assembly and associated components are subjected to mechanical vibrations when the engine is operating. Mechanical vibrations in the engine assembly may cause the fuel lines, along with the fluid that passes through the fuel lines, to vibrate.

One issue with mechanical vibrations of an engine assembly is that the mechanical vibrations cause the fluid in the fuel lines to fluctuate. Pressure fluctuations or flow fluctuations in the fluid may manifest as combustion instabilities of the engine assembly. Additionally, pressure and flow fluctuations in the fluid can create a feedback loop of instability creating further mechanical vibrations in the fluid, fuel lines, or the engine assembly. The mechanical vibrations caused by the feedback loop of instability together with the mechanical vibrations caused by the operating engine may create coherent acoustic coupling fluctuations in the fluid.

BRIEF DESCRIPTION

In one embodiment, an inline fluid damper device includes a flow-through conduit configured to be placed inside a larger exterior conduit through which a fluid flows. The flow-through conduit is elongated and extends around a center axis. The damper device also includes an indirect flow conduit coupled with the flow-through conduit. The indirect flow conduit is also configured to be placed inside the larger exterior conduit. The flow-through conduit and the indirect flow conduit are configured to dampen one or more flow fluctuations or pressure fluctuations in the fluid flowing in the larger exterior conduit by dividing the fluid into a first portion that flows along the center axis through the flow-through conduit and a second portion that concurrently flows outside of the flow-through conduit along the center axis and along a different direction.

In one embodiment, an inline fluid damper device includes plural elongated stems that couple with each other at plural nodes. The stems form an elongated flow-through conduit extending around a center axis. The flow-through conduit is configured to be placed inside a larger exterior conduit through which a fluid flows. The stems are configured to dampen one or more of flow fluctuations or pressure fluctuations in the fluid flowing in the larger exterior conduit by dividing the fluid such that at least some of the fluid flows through the flow-through conduit without contacting the stems and at least some of the fluid concurrently flows through the flow-through conduit and contacts the stems.

In one embodiment, an inline fluid damper device includes a flow-through conduit configured to be placed inside a larger exterior conduit through which a fluid flows. The flow-through conduit is elongated and extends around a center axis. The damper device also includes an indirect flow conduit coupled with the flow-through conduit. The indirect flow conduit is also configured to be placed inside the larger exterior conduit. The flow-through conduit and the indirect flow conduit are configured to dampen one or more flow fluctuations or pressure fluctuations in the fluid flowing in the larger exterior conduit by dividing the fluid into a first portion that flows along the center axis through the flow-through conduit and a second portion that concurrently flows outside of the flow-through conduit along the center axis and along a different direction. The flow-through conduit is configured to extend from a first end to a second end. The indirect flow conduit creates a longer flow path for the second portion of the fluid to flow from the first end to the second end relative to a flow path created by the flow-through conduit for the first portion of the fluid to flow from the first end to the second end.

BRIEF DESCRIPTION OF THE DRAWINGS

The present inventive subject matter will be better understood from reading the following description of non-limiting embodiments, with reference to the attached drawings, wherein below.

DETAILED DESCRIPTION

One or more embodiments of the subject matter described herein relate to devices that dampen flow fluctuations or pressure fluctuations in a fluid that is flowing through a larger exterior conduit. The devices include an inline fluid damper device that is placed inside of the larger exterior conduit. The damper device includes one or more interior conduits that divide the fluid that is flowing through the exterior conduit into one or more portions. The divided fluid flows along a center axis and in one or more different directions along one or more flow paths created by the interior conduits. One technical effect of the subject matter described herein is improved reduction of fluid pressure or flow fluctuations responsive to mechanical vibrations caused by the engine assembly in operation. For example, the systems and methods described herein may improve the reduction of fuel line pressure fluctuations or fuel line flow fluctuations in the fluid responsive to the fluid being unsteady or responsive to the engine assembly creating and/or causing mechanical vibrations, or the like.

Figure 1:
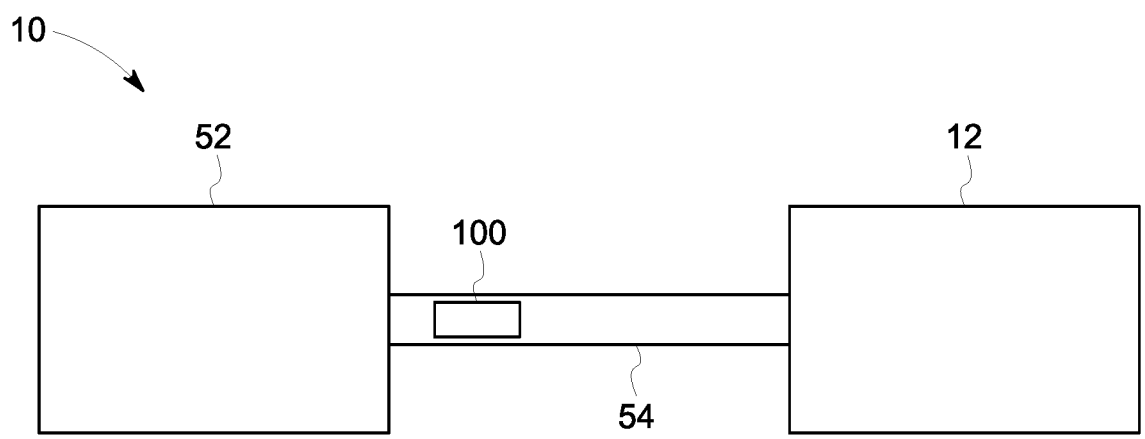
FIG. 1 illustrates an assembly in accordance with one embodiment.

FIG. 1 illustrates an assembly 10 in accordance with one embodiment. The system 10 includes an exterior conduit 54 that is coupled between a system 12 and a reservoir 52. The exterior conduit 54 is a conduit (e.g., channel, tube, hose, pipe, or the like) that delivers fluid from the reservoir 52 to the system 12. For example, the exterior conduit 54 may be a fuel line and the system 12 may be an engine system. The exterior conduit 54 may provide the passage of fuel from the reservoir 52 to a combustor of the engine system. Optionally, the system 12 may be any alternative mechanical system and the exterior conduit 54 may pass any fluid between the reservoir 52 and the system 12. The exterior conduit 54 may be rigid, flexible, or a combination of rigid and flexible along the length of the exterior conduit 54 between the reservoir 52 and the system 12. Optionally, plural exterior conduits 54 may be operably coupled with the reservoir 52, the system 12, an alternative reservoir (not shown), a second system, another component, or any combination therein.

An inline fluid damper device 100 is disposed inside the exterior conduit 54 at a location between the reservoir 52 and the system 10. For example, the inline fluid damper device 100 is located upstream of the system 10. The exterior conduit 54 may be referred to as a larger exterior conduit 54 such that the larger exterior conduit 54 has a cross-sectional area that is larger relative to the size and/or shape of the damper device 100. For example, the damper device 100 is sized and shaped in order to be entirely contained within the larger exterior conduit 54. In the illustrated embodiment, the damper device 100 is disposed at a position that is closer to the reservoir 52 than the system 12. Optionally, the damper device 100 may be disposed at any location between the reservoir 52 and the system 12. Additionally or alternatively, one or more damper devices 100 may be disposed inside of the larger exterior conduit 54. For example, a first damper device 100 may be disposed closer to the reservoir 52 and a second damper device may be disposed closer to the system 12 such that the fluid sequentially flows through the first damper device then the second damper device between the reservoir 52 and the system 12. Optionally, one or more damper devices 100 may be disposed inside of the fuel line 54 at any location, in any configuration, or the like. The damper device 100 is configured to substantially fill an interior chamber of the larger exterior conduit 54. Optionally, the damper device 100 may not substantially fill the interior chamber of the larger exterior conduit 54.

Figure 2:
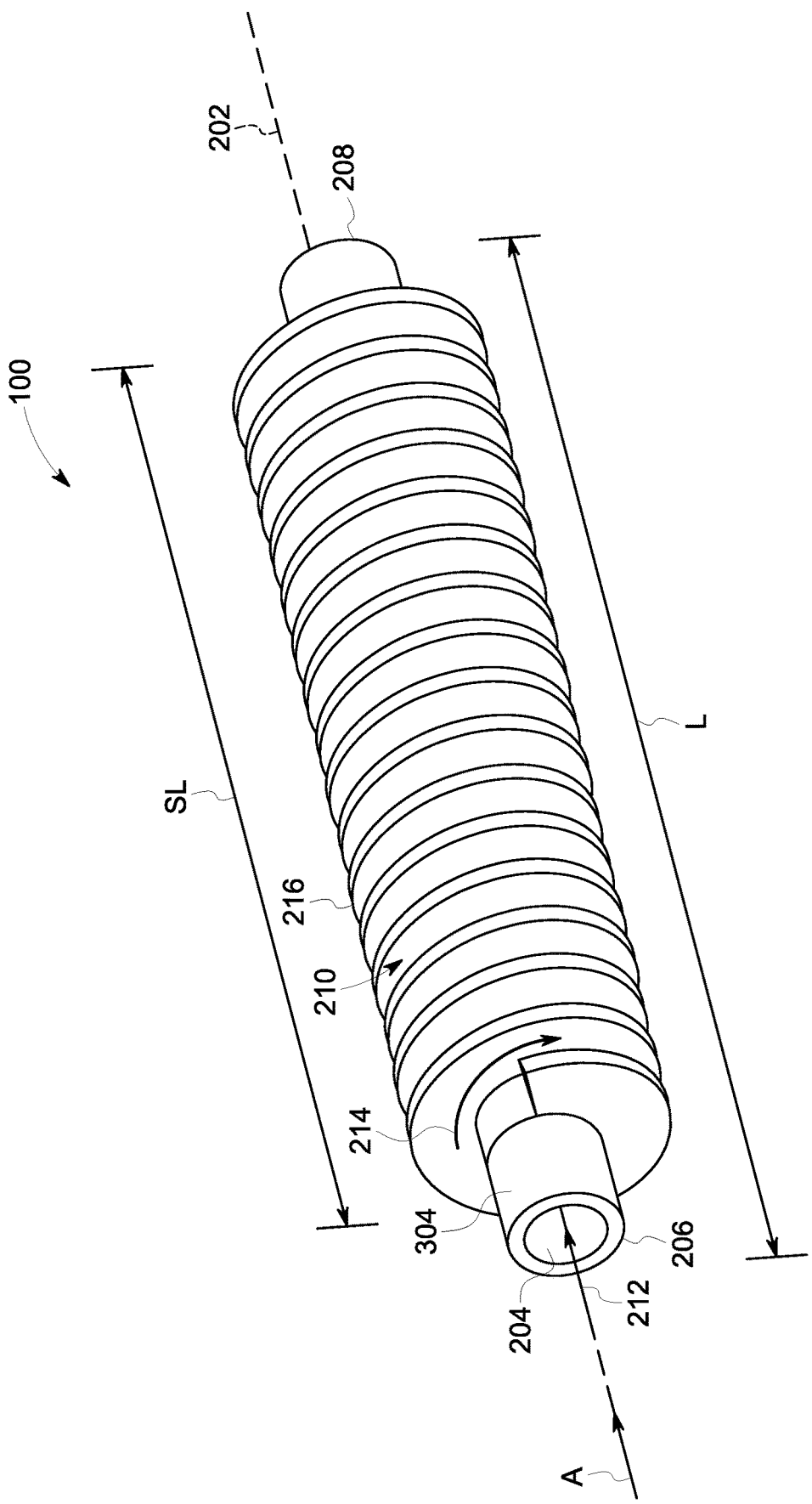
FIG. 2 illustrates a perspective view of an inline fluid damper device in accordance with one embodiment.

FIG. 2 illustrates a perspective view of the inline fluid damper device 100 in accordance with one embodiment. The damper device 100 includes one or more interior conduits that are placed inside of the larger exterior conduit 54. In the illustrated embodiment of FIG. 2, the inline fluid damper device 100 includes two interior conduits 204, 210. The interior conduit 204 may be referred to herein as a flow-through conduit 204, and the interior conduit 210 may be referred to as an indirect flow conduit 210. Optionally, the damper device 100 may include plural flow-through conduits 204 and/or plural indirect flow conduits 210.

The flow-through conduit 204 extends a length L between a first end 206 and a second end 208. The flow-through conduit 204 is a channel or passage through which fluid flows between the first end 206 and the second end 208. Additionally or alternatively, the damper device 100 may include two or more flow-through conduits 204 through which fluid flows between the first and second ends 206, 208. The flow-through conduit 204 is elongated along and extends around a center axis 202. In the illustrated embodiment, the flow-through conduit 204 is substantially centered about the center axis 202 between the first and second ends 206, 208. Optionally, the flow-through conduit 204 may not be centered about the center axis 202 along the length L. Additionally or alternatively, the flow-through conduit 204 may extend along a different axis. For example, the flow-through conduit 204 may be substantially centered about the center axis 202 at a position near the first end 206, and may not be substantially centered about the center axis 202 at a position near the second end 208. Additionally or alternatively, the flow-through conduit 204 may extend along a different axis that is substantially parallel with the center axis 202.

In the illustrated embodiment, the flow-through conduit 204 has a substantially circular cross-sectional shape and is tubular between the first and second ends 206, 208. Optionally, the flow-through conduit 204 may have any alternative cross-sectional shape such as, but not limited to, quadrilateral, oval, or the like. Optionally, the flow-through conduit 204 may have one or more different and/or varying cross-sectional shapes along the length L between the first end 206 and the second end 206. For example, the conduit 204 may have a circular cross-sectional shape at a position near the first end 206 and may have a quadrilateral cross-sectional shape at a position near the second end 208, may have a circular cross-sectional shape near the first end 206 and a concentric smaller or larger circular cross-sectional shape near the second end 208, or the like.

The indirect flow conduit 210 is operably coupled with the flow-through conduit 204 and disposed outside of the flow-through conduit 204. The indirect flow conduit 210 extends a length SL along the center axis 202. In the illustrated embodiment, the length SL is less than the length L of the flow-through conduit 204. Additionally or alternatively, the length SL may be substantially equal to the length L. The indirect flow conduit 210 may begin substantially at or near the first end 206, may end substantially at or near the second end 208, or a combination therein.

The indirect flow conduit 210 includes a spiral protrusion 216 that is helically wrapped around the flow-through conduit 204. The spiral protrusion 216 radially protrudes from the flow-through conduit 204 away from the center axis 202. For example, the spiral protrusion 216 protrudes away from the flow-through conduit 204 in a radial direction generally perpendicular to or otherwise away from the center axis 202. Optionally, one or more of the spirals of the spiral protrusion may extend in any direction away from the flow-through conduit 204.

In the illustrated embodiment, the spiral protrusion 216 is helically wrapped seventeen times around the flow-through conduit 204 and each protrusion is disposed equidistance apart from each other along the length SL. Optionally, the spiral protrusion 216 may include any number of helically wrapped spirals. Additionally or alternatively, any number of the spiral protrusions may be positioned equidistance or non-equidistance apart from each other along the length SL. Additionally, each spiral extends substantially equal distances radially away from the flow-through conduit 204. Optionally, one or more of the spirals may extend a distance less than or greater than one or more alternative spirals.

In the illustrated embodiment, the spiral protrusion 216 extends the length SL that is less than the length L of the flow-through conduit 204. For example, the spiral protrusion 216 is helically wrapped around the flow-through conduit 204 at least partially between the first end 206 and the second end 208 of the flow-through conduit 204 along the center axis 202. Optionally, the spiral protrusion 216 may be helically wrapped around the flow-through conduit 204 a length that is substantially equal to the length L between the first and second ends 206, 208. In the illustrated embodiment, the spiral protrusion 216 extends a continuous length along the length SL of the indirect flow conduit 210. Additionally or alternatively, one or more spiral protrusions 216 may extend one or more common and/or unique non-continuous lengths. Optionally, one or more spiral protrusions 216 may have any alternative configuration.

The damper device 100 is a unitary device that includes the flow-through conduit 204 integrally formed with the indirect flow conduit 210 as a single device manufactured of a common material. For example, the damper device 100, including the flow-through conduit 204 and the indirect flow conduit 210, may be die-cast, injection molded, machined, or the like. Additionally or alternatively, one or more of the interior conduits (e.g., the flow-through conduit 204 or the indirect flow conduit 210) may be formed as separate components. For example, the indirect flow conduit 210 may be welded to, printed on, mechanically fastened to, or the like, the flow-through conduit 204. Additionally or alternatively, the flow-through conduit 204 may be manufactured out of a material that is unique to the material of the indirect flow conduit 210. Optionally, the damper device may be manufactured by any alternative methods. The damper device 100 and/or one or more of the flow-through conduit 204 or the indirect flow conduit 210 may be manufactured of a metallic alloy or a non-metallic material. Optionally, the damper device 100 may be a flexible or rigid device. For example, the damper device 100 may be flexible such that the device 100 may flex in order to conform to the larger exterior conduit 54.

Figure 3:
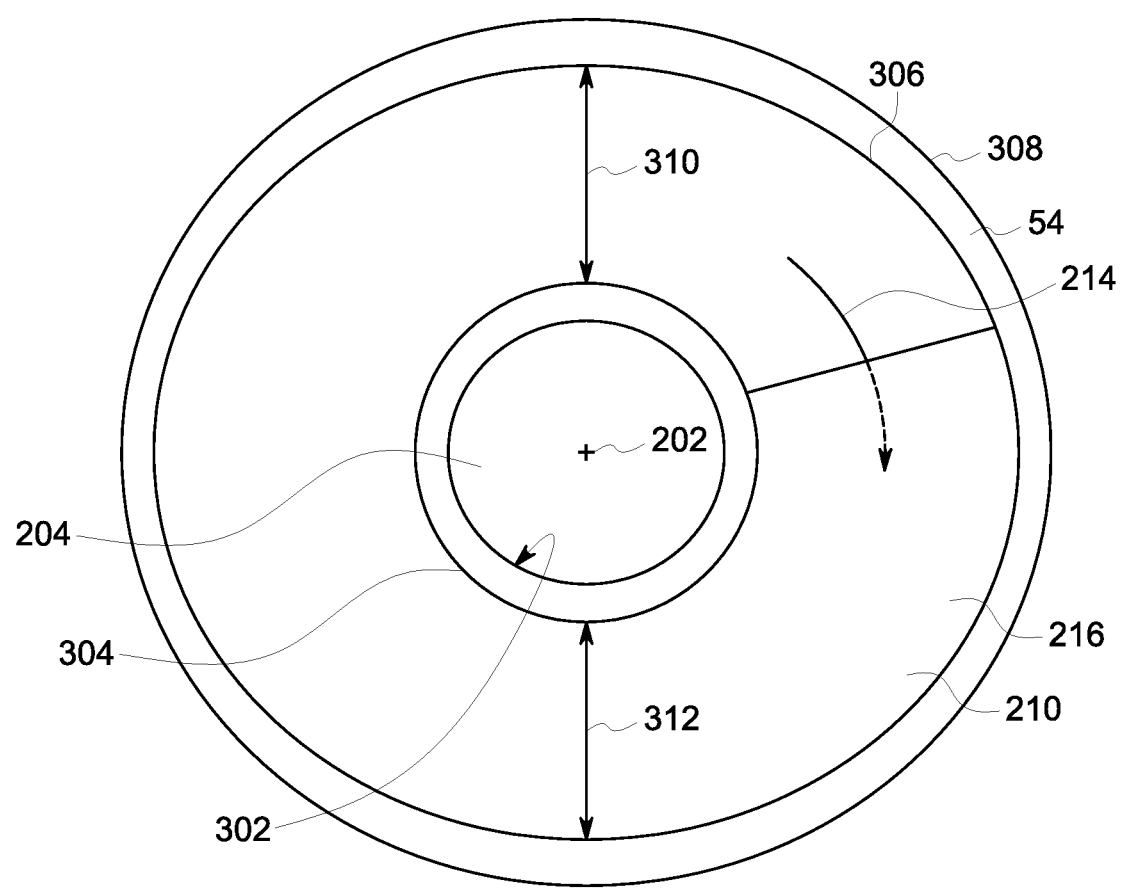
FIG. 3 illustrates a cross-sectional view of the inline fluid damper device of FIG. 2 in accordance with one embodiment.

FIG. 3 illustrates a cross-sectional view of the inline fluid damper device 100 that is disposed inside of the larger exterior conduit 54 in accordance with one embodiment. The spiral protrusion 216 radially protrudes distances 310, 312 between the flow-through conduit 204. For example, the spiral protrusion 216 is operably coupled with the flow-through conduit 204 at an outer surface 304 of the flow-through conduit 204. The spiral protrusion 216 extends distances 310, 312 from the outer surface 304 of the flow-through conduit 204 to an inner surface 306 of the larger exterior conduit 54. In the illustrated embodiment of FIG. 3, the flow-through conduit 204 is generally centered about the center axis 202, and the spiral protrusion 216 radially protrudes away from the flow-through conduit 204. Additionally or alternatively, the distance 310 may be greater than (e.g., a larger distance) or less than (e.g., a shorter distance) than the distance 312 between the outer surface 304 and the inner surface 306. For example, the flow-through conduit 204 and the spiral protrusion 216 may not be generally centered about the center axis 202.

Referring to FIGS. 2 and 3, the damper device 100 placed inside of the larger exterior conduit 54 divides the fluid that is flowing in a direction A from the reservoir 52 into a first portion 212 and a second portion 214. The first portion 212 of the fluid flows along the center axis 202 through the flow-through conduit 204 from the first end 206 to the second end 208. Optionally, the first portion 212 may flow in a direction from the second end 208 to the first end 206. The second portion 214 of the fluid flows outside of the flow-through conduit 204 along the center axis 202 and along a different direction. For example, the second portion 214 of the fluid flows in a direction around the spiral protrusion 216 of the indirect flow conduit 210 along the center axis 202. The first and second portions 212, 214 of the fluid may contain substantially the same or substantially different volumes of the fluid. For example, the flow-through conduit 204 may be sized and shaped such that the flow-through conduit 204 may allow more or less fluid (e.g., a larger or smaller volume of fluid) to be divided into the first portion 212 relative to the second portion 214.

The first portion 212 of the fluid flows through the flow-through conduit 204 concurrently with the second portion 214 of the fluid that flows outside of the flow-through conduit 204 (e.g., along the path created by the indirect flow conduit 210), respectively. For example, the fluid flowing in the direction A that is divided into the first and second portions 212, 214 flows through the flow-through conduit 204 and outside of the flow-through conduit 204 (e.g., along the flow path of the indirect flow conduit 210) at substantially the same time. Additionally, the indirect flow conduit 210 creates a longer flow path for the second portion 214 of the fluid to flow from the first end 206 to the second end 208 relative to the flow path created by the flow-through conduit 204 for the first portion 212 of the fluid to flow from the first end 206 to the second end 208. For example, the time it takes for the second portion 214 of the fluid to flow along the path created by the indirect flow conduit 210 is longer (e.g., a larger or greater amount of time) relative to the time it takes for the first portion 212 of the fluid to concurrently flow (e.g., flow at substantially the same time) along the path created by the flow-through conduit 204.

Figure 4:
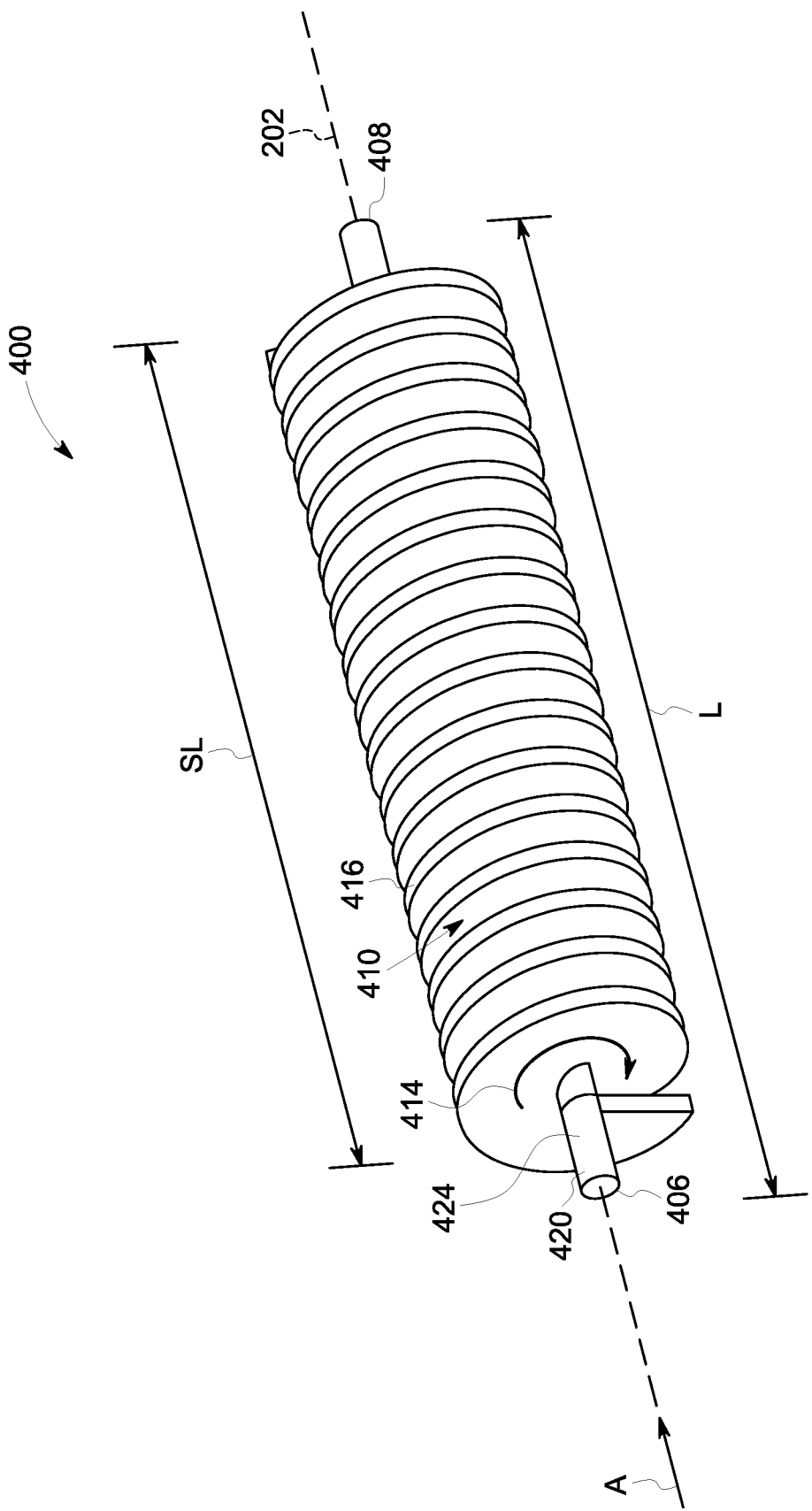
FIG. 4 illustrates a perspective view of an inline fluid damper device in accordance with one embodiment.

FIG. 4 illustrates a perspective view of an inline fluid damper device 400 in accordance with one embodiment. The damper device 400 includes a rod 420 and an interior conduit 410. The interior conduit 410 may be referred to herein as an indirect flow conduit 410. The rod 420 extends a length L between a first end 406 and a second end 408 along the center axis 202. The indirect flow conduit 410 extends a length SL along the center axis 202. In the illustrated embodiment, the length SL is less than the length L of the rod 420. Additionally or alternatively, the length SL may be substantially equal to the length L. The indirect flow conduit 410 may begin substantially at the first end 406, may end substantially at the second end 408, or a combination therein.

The indirect flow conduit 410 includes a spiral protrusion 416 that is helically wrapped around the rod 420. In the illustrated embodiment, the spiral protrusion 416 is helically wrapped seventeen times around the rod 420 and each protrusion is disposed equidistance apart from each other protrusion along the length SL. Optionally, the spiral protrusion 416 may include any number of helically wrapped spirals that are spaced any uniform and/or non-uniform distances apart from each other. In the illustrated embodiment, each spiral of the spiral protrusion 416 radially protrudes a common distance away from an exterior surface 424 of the rod 420. For example, each spiral of the spiral protrusion 416 extends radially away from the center axis 202 between the exterior surface 424 and an inner surface of the larger exterior conduit 54 (e.g., inner surface 306). Optionally, one or more spirals may not extend to the inner surface of the exterior conduit 54.

The damper device 400 is placed inside of the larger exterior conduit 54 and directs the fluid that is flowing in a direction A from the reservoir into a portion 414. The portion 414 of the fluid flows outside of the rod 420 along the center axis 202 and in a direction around the spiral protrusion 416 of the indirect flow conduit 410 along the center axis 202. The spiral protrusion 416 of the indirect flow conduit 410 creates a longer flow path for the portion 414 of the fluid to flow from the first end 406 to the second end 408 relative to a flow path that is devoid the spiral protrusion 416. For example, the indirect flow conduit 410 of the damper device 400 creates a flow path for the fluid to flow such that the fluid flowing in the direction A flows slower along the flow path created by the indirect flow conduit 410 relative to the flow of the fluid outside of the indirect flow conduit 410 and inside of the larger exterior conduit 54 (e.g., before and/or after the fluid flows through the indirect flow conduit 410). Additionally or alternatively, the spiral protrusion 416 of the indirect flow conduit 410 may be shaped and/or sized in order to change the speed of the fluid that flows through the damper device 400.

Figure 5:
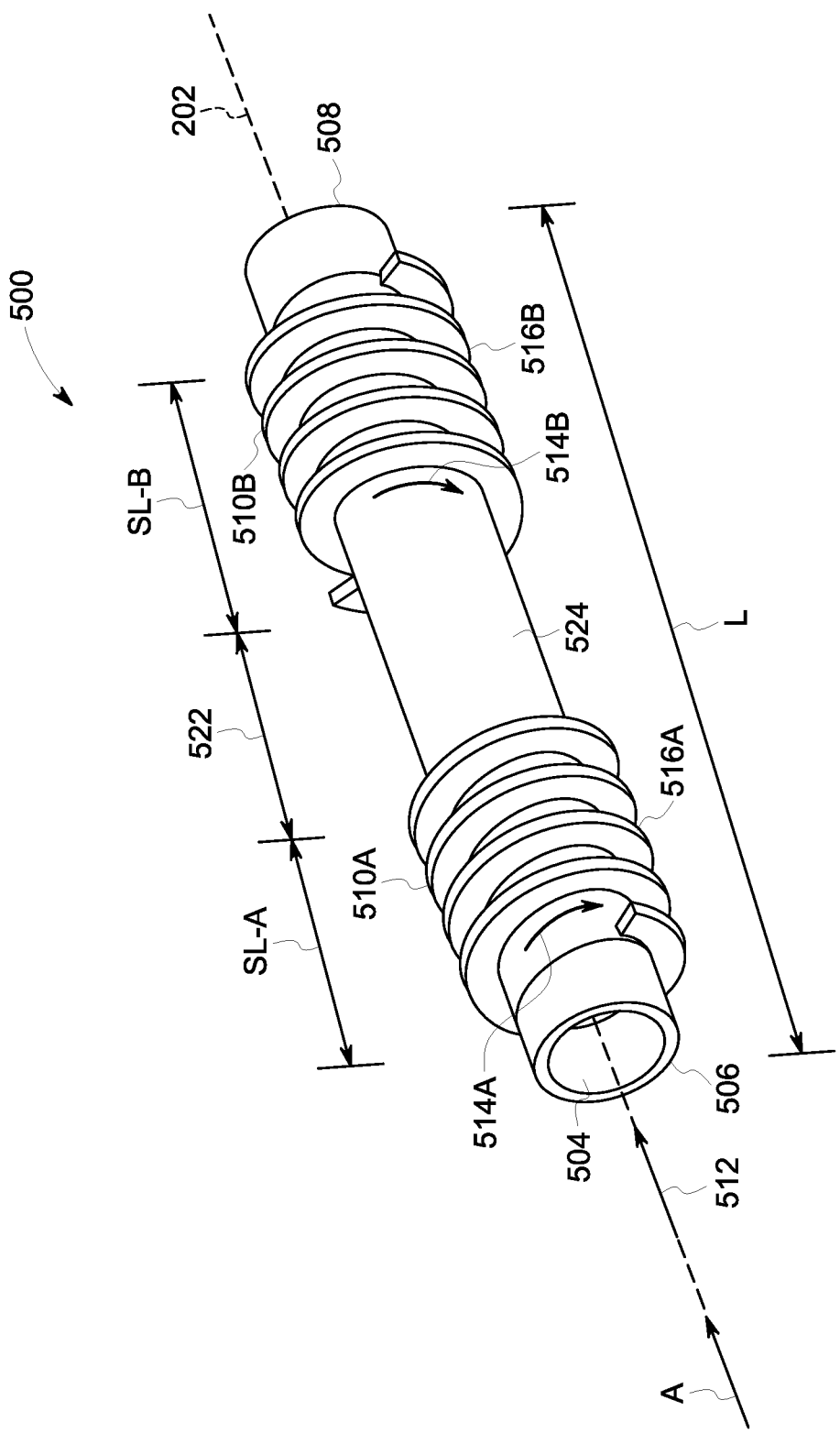
FIG. 5 illustrates a perspective view of an inline fluid damper device in accordance with one embodiment.

FIG. 5 illustrates a perspective view of an inline fluid damper device 500 in accordance with one embodiment. The damper device 500 includes interior conduits 504, 510A, 510B. The interior conduit 504 may be referred to herein as a flow-through conduit 504, the conduit 510A may be referred to herein as a first indirect flow conduit 510A, and the conduit 510B may be referred to herein as a second indirect flow conduit 510B. The flow-through conduit 504 extends a length L between a first end 506 and a second end 508 along the center axis 202. The first and second indirect flow conduits 510A, 510B are operably coupled with the flow-through conduit 504 and are disposed outside of the flow-through conduit 504. The first indirect flow conduit 510A extends a length SL-A along the center axis 202 and the second indirect flow conduit 510B extends a length SL-B along the center axis 202. In the illustrated embodiment, the length SL-A is substantially equal to the length SL-B. Optionally, the first indirect flow conduit 510A may extend a length SL-A that may be less than or greater than the length SL-B of the second indirect flow conduit 510B. Additionally, the lengths SL-A, SL-B are separated by a distance 522 in a direction along the center axis 202. Optionally, the lengths SL-A, SL-B may be separated by a distance greater than or less than the distance 522.

The first and second indirect flow conduits 510A, 510B include spiral protrusions 516A, 516B, respectively, that are helically wrapped around the flow-through conduit 504. For example, the spiral protrusions 516A, 516B radially protrude from an outer surface 524 of the flow-through conduit 504 away from the center axis 202. In the illustrated embodiment, the spiral protrusion 516A of the first indirect flow conduit 510A is helically wrapped five times around the flow-through conduit 504, and the spiral protrusion 516B of the second indirect flow conduit 510B is helically wrapped five times around the flow-through conduit 504. Optionally, the first and/or second indirect flow conduits 510A, 510B may include less than five or more than five spirals wrapped around the flow-through conduit 504.

The damper device 500 placed inside of the larger exterior conduit 54 divides the fluid that is flowing in the direction A into a first portion 512 and a second portion 514. The first portion 512 flows along the center axis 202 through the flow-through conduit 504 between the first end 506 and the second end 508. The second portion 514 flows outside of the flow-through conduit 504 along the center axis 202 and along a different direction. For example, the second portion 514 flows in a direction around the spiral protrusions 516 of the first and second indirect flow conduits 510A, 510B. For example, the second portion 514 of the fluid flows along the flow path created by the spiral protrusion 516A of the first indirect flow conduit 510A and then along the flow path created by the spiral protrusion 516B of the second indirect flow conduit 510B.

In the illustrated embodiment, the flow paths created by the spiral protrusions 516 of the first and second indirect flow conduits 510A, 510B rotatably extend in a common direction around the center axis 202 (e.g., in a clockwise direction). Optionally, the spiral protrusions of the first and/or second indirect flow conduits 510A, 510B may create a flow path that flows in a unique direction around the center axis 202. For example, the second portion 514A of the fluid may first flow in a clockwise direction around the spiral protrusion 516A of the first indirect flow conduit 510A and then the second portion 514B may flow in a counter-clockwise direction around the spiral protrusion 516B of the second indirect flow conduit 510B, or any alternative combination therein. Additionally or alternatively, the damper device 500 may include more than two indirect flow conduits 510 that may direct the second portion 514 of the fluid to flow in any direction.

The first portion 512 of the fluid flows through the flow-through conduit 504 concurrently with the second portion 514 of the fluid that flows outside of the flow-through conduit 504 (e.g., along the path created by the first and second indirect flow conduits 510A, 510B). For example, the fluid flowing in the direction A that is divided into the first and second portions 512, 514 flows along the flow paths created by the flow-through conduit 504 and the first and second indirect flow conduits 510A, 510B at substantially the same time. Additionally, the first and second indirect flow conduits 510A, 510B create a longer flow path for the second portion 514 of the fluid to flow from the first end 506 to the second end 508 relative to the flow path created by the flow-through conduit 504 for the first portion 512 of the fluid to flow from the first end 506 to the second end 508. For example, the time it takes for the second portion 514 of the fluid to flow along the flow path created by the indirect flow conduits 510A, 510B is longer (e.g., a larger or greater amount of time) relative to the time it takes for the first portion 512 of the fluid to concurrently flow along the flow path created by the flow-through conduit 504.

Figure 6:
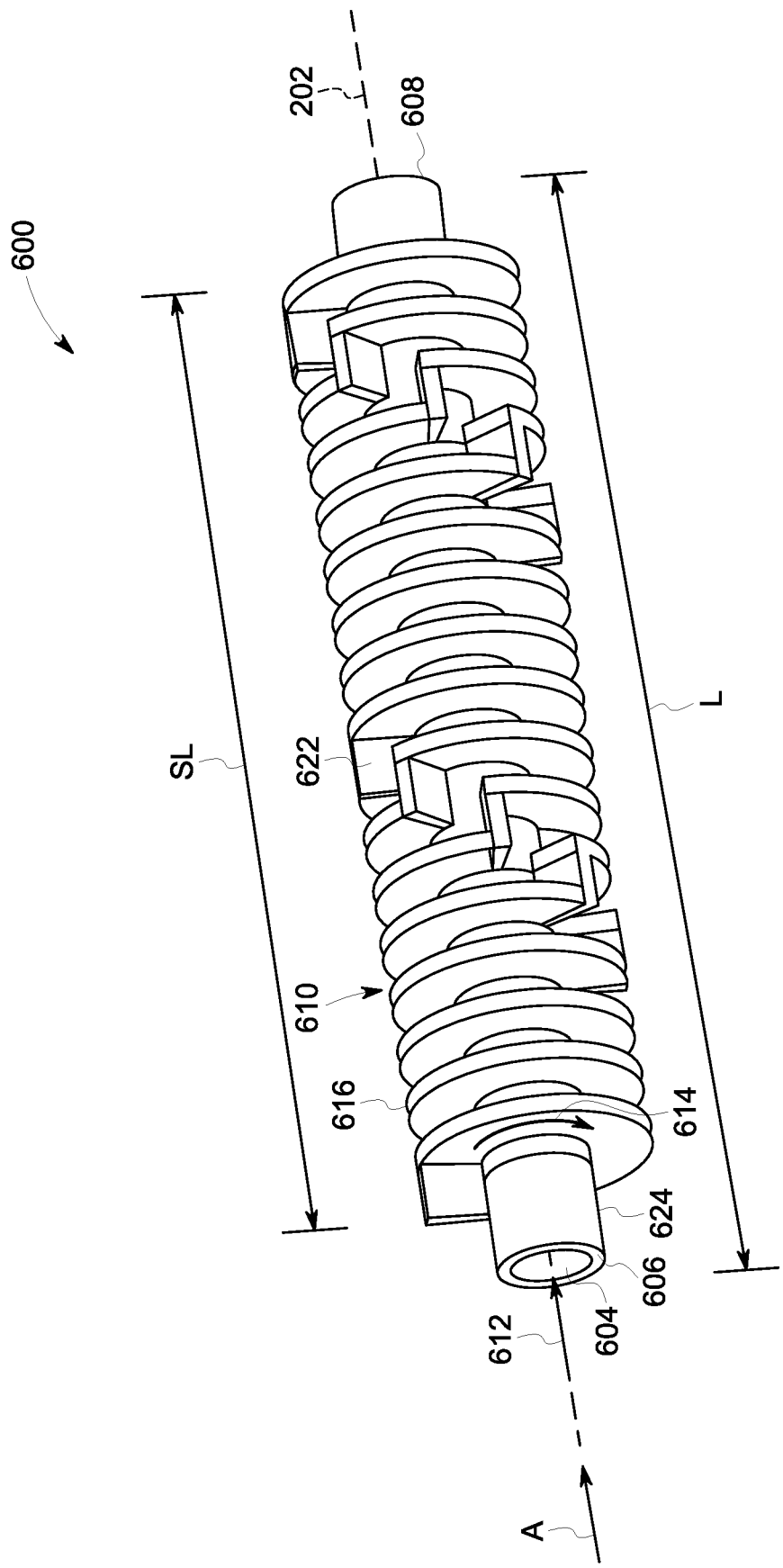
FIG. 6 illustrates a perspective view of an inline fluid damper device in accordance with one embodiment.

FIG. 6 illustrates a perspective view of an inline fluid damper device 600 in accordance with one embodiment. The damper device 600 includes interior conduits 604 and 610. The interior conduit 604 may be referred to herein as a flow-through conduit 604, and the interior conduit 610 may be referred to herein as an indirect flow conduit 610. The flow-through conduit 604 is elongated along and generally centered about the center axis 202 between first and second ends 606, 608. Optionally, the flow-through conduit 604 may not be generally centered about the center axis 202, the damper device 600 may include two or more flow-through conduits 604 that may be operably coupled with each other flow-through conduit 604 and may be elongated along the center axis 202, or any combination therein. The indirect flow conduit 610 is operably coupled with the flow-through conduit 604 and disposed outside of the flow-through conduit 604. Optionally, two or more indirect flow conduits 610 may be operably coupled with and disposed outside of the flow-through conduit 604.

The indirect flow conduit 610 includes a spiral protrusion 616 that is helically wrapped around the flow-through conduit 604. For example, the spiral protrusion 616 radially protrudes from an outer surface 624 of the flow-through conduit 604 away from the center axis 202. The spiral protrusion 616 includes plural baffles 622 that are disposed along the length SL of the indirect flow conduit 610. The baffles 622 extend between and operably couple two or more of the spirals of the spiral protrusion 616 along the length SL. For example, the baffles 622 may be referred to as steps or plates that protrude in a direction generally parallel to the elongated direction of the damper device 600. Optionally, the baffles 622 may protrude in any direction between two or more spirals.

The damper device 600 placed inside of the larger exterior conduit 54 divides the fluid that is flowing in the direction A into a first portion 612 and a second portion 614. The first portion flows along the center axis 202 through the flow-through conduit 604. The second portion 614 flows outside of the flow-through conduit 604 and along a flow path that is created by the baffles 622 and spirals of the spiral protrusion 616 of the indirect flow conduit 610. The indirect flow conduit 610 creates a longer flow path for the second portion 614 of the fluid to flow from the first end 606 to the second end 608 relative to the flow path created by the flow-through conduit 604 for the first portion 612 of the fluid to flow from the first end 606 to the second end 608. For example, the time is takes for the second portion 614 of the fluid to flow along the flow path created by the indirect flow conduit 610 is longer (e.g., a larger or greater amount of time) relative to the time it takes for the first portion 612 of the fluid to concurrently flow along the flow path created by the flow-through conduit 604.

Figure 7:
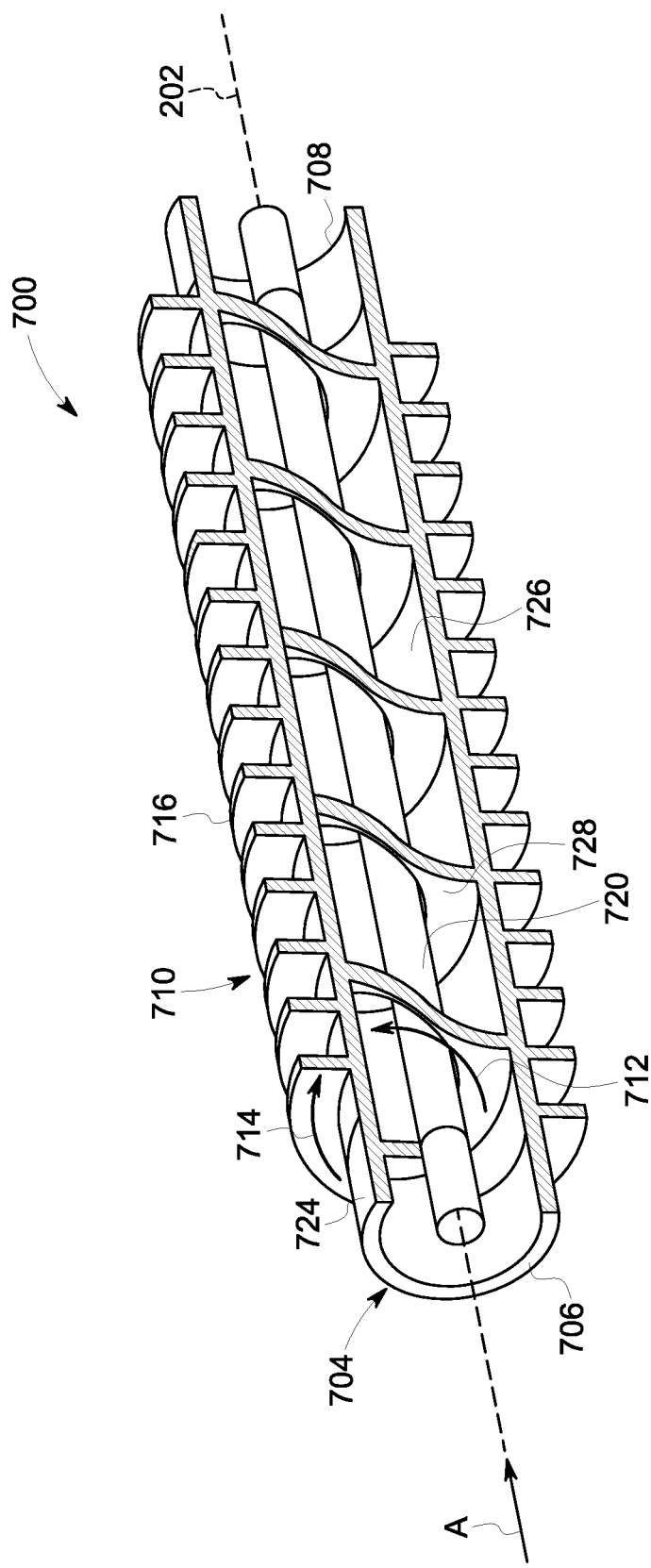
FIG. 7 illustrates a cross-sectional perspective view of an inline fluid damper device in accordance with one embodiment.

FIG. 7 illustrates a cross-sectional perspective view of an inline fluid damper device 700 in accordance with one embodiment. The damper device 700 includes interior conduits 704 and 710. The interior conduit 704 may be referred to herein as a flow-through conduit 704, and the interior conduit 710 may be referred to herein as an indirect flow conduit 710. The flow-through conduit 704 is elongated along and generally centered about the center axis 202 between first and second ends 706, 708. The flow-through conduit 704 includes an inner surface 726 and an outer surface 724. The flow-through conduit 704 includes a rod 720 that is elongated along and is generally centered about the center axis 202. In the illustrated embodiment, the rod 720 is a solid or closed rod. Optionally, the rod 720 may be an open passage or channel between the first end 706 and the second end 708.

The flow-through conduit 704 also includes an inner spiral protrusion 728 that is operably coupled with the inner surface 726 of the flow-through conduit 704. The inner spiral protrusion 728 is helically wrapped around the rod 720 between the first and second ends 706, 708. In the illustrated embodiment, the inner spiral protrusion 728 includes five spirals that are disposed substantially equidistance apart from each other. Optionally, the inner spiral protrusion 728 may include any number of spirals, the spirals may be spaced apart any common or unique distances, the spirals may have a multi-spiral counter-rotating configuration, may have a multi-spiral co-rotating configuration, or any combination therein.

The indirect flow conduit 710 is operably coupled with the outer surface 724 of the flow-through conduit and is disposed outside of the flow-through conduit 704. Optionally, two or more indirect flow conduits 710 may be operably coupled with and disposed outside of the flow-through conduit 704. The indirect flow conduit 710 includes a spiral protrusion 716 that is helically wrapped around the flow-through conduit 704. For example, the spiral protrusion 716 radially protrudes from the outer surface 724 of the flow-through conduit 704 away from the center axis 202.

The damper device 700 placed inside of the larger exterior conduit 54 divides the fluid into a first portion 712 and a second portion 714. The first portion 712 flows through the flow-through conduit 704 and along the flow path created by the rod 720 and the inner spiral protrusion 728. For example, the first portion 712 of the fluid flows through the flow-through conduit 704 along the center axis 202 in a rotating counter-clockwise direction from the first end 706 to the second end 708. The second portion 714 flows outside of flow-through conduit 704 and along a flow path that is created by the spirals of the spiral protrusion 716. For example, the second portion 714 of the fluid flows outside of the flow-through conduit 704 along the center axis 202 in a rotating clockwise direction from the first end 706 to the second end 708. Additionally or alternatively, the inner spiral protrusion 728 and the spiral protrusion 716 may be helically wrapped around the flow-through conduit 704 such that the first portion 712 of the fluid and the second portion 714 of the fluid flow in the same rotating direction from the first end 706 to the second end 708. For example, the inner spiral protrusion 728 may be shaped in order to create a flow path for the first portion 712 of the fluid to flow in a same rotating direction as the flow path for the second portion 714 that is created by the spiral protrusion 716.

In the illustrated embodiment, the spiral protrusion 716 of the indirect flow conduit 710 is shaped and/or sized in order to create a longer flow path for the second portion 714 of the fluid to flow from the first end 706 to the second end 708 relative to flow path created by the inner spiral protrusion 728 of the flow-through conduit 704 for the first portion 712 of the fluid to concurrently flow from the first end 706 to the second end 708. Optionally, the inner spiral protrusion 728 and/or the rod 720 of the flow-through conduit 704 may be shaped and/or sized in order to create a longer flow path for the first portion 712 for the fluid to flow relative to the second portion 714 of the fluid. Optionally, the inner spiral protrusion 728 may be shaped and/or sized in order to create a flow path for the first portion 712 that has a length that is substantially the same as a length of the flow path created by the spiral protrusion 716 of the indirect flow conduit 710. For example, the flow-through conduit 704 and the indirect flow conduit 710 may be shaped/sized in order for the first and second portions 712, 714 of the fluid to concurrently flow through the damper device 700 in substantially the same amount of time or in different amounts of time.

Figure 8:
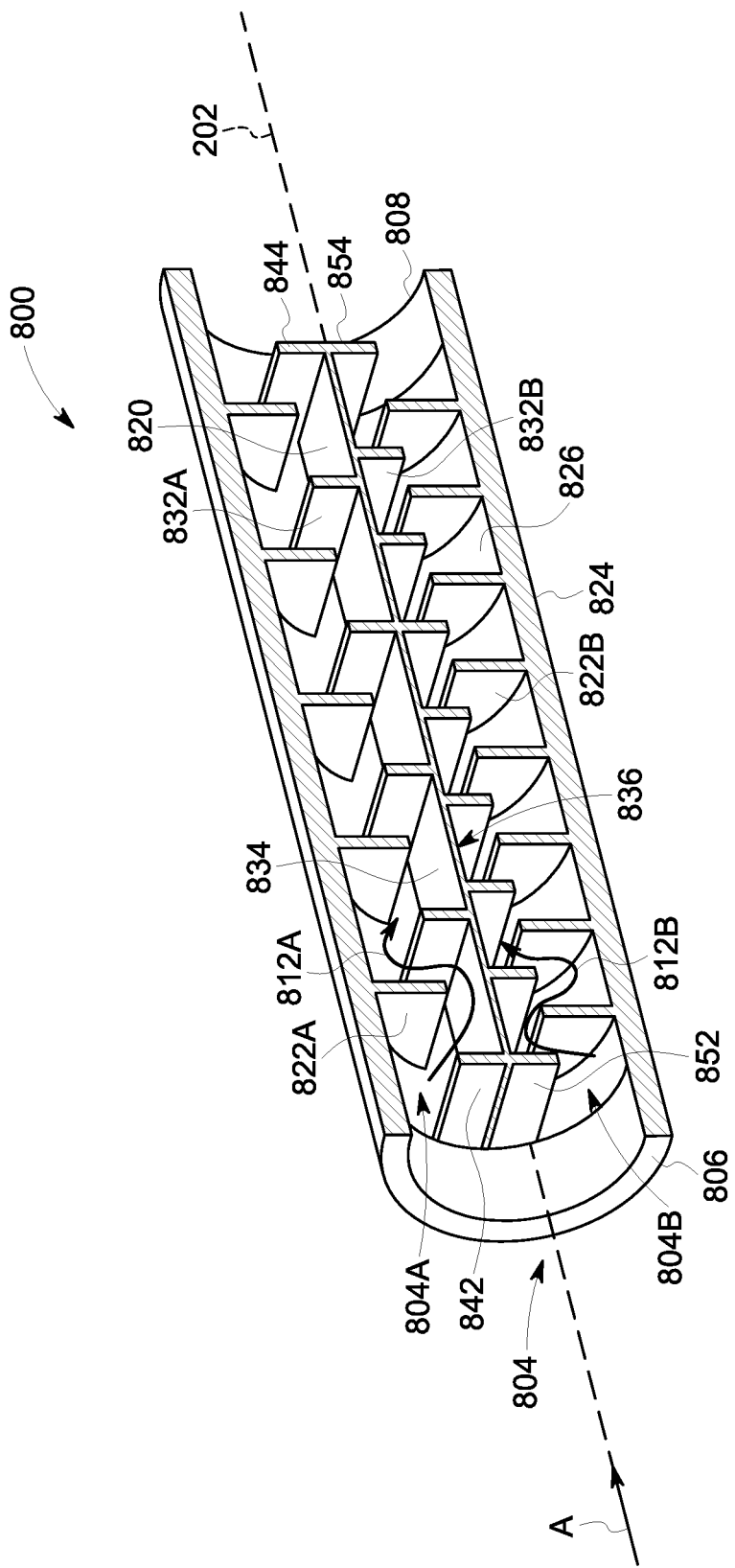
FIG. 8 illustrates a cross-sectional perspective view of an inline fluid damper device in accordance with one embodiment.

FIG. 8 is a cross-sectional perspective view of an inline fluid damper device 800 in accordance with one embodiment. The damper device 800 includes an interior conduit 804. The interior conduit 804 may be referred to as a flow-through conduit 804. The flow-through conduit 804 is elongated along the center axis 202 between first and second ends 806, 808. The flow-through conduit 804 includes an inner surface 826 and an outer surface 824.

The damper device 800 includes a plate 820 that is disposed inside of the flow-through conduit 804. The plate 820 is elongated along and generally centered about the center axis 202. The plate 820 extends between a first end 842 that is disposed near the first end 806 of the flow-through conduit 804 and a second end 844 that is disposed near the second end 806 of the flow-through conduit 804. In the illustrated embodiment, the plate 820 extends a distance between the first and second ends 842, 844 that is shorter than the length of the flow-through conduit 804. Optionally, the plate 820 may extend a length that is substantially the same length as the flow-through conduit 804. Additionally, the first end 842 includes a first end baffle 852 and the second end 844 includes a second end baffle 854. The first and second end baffles 852, 855 protrude a distance away from the plate 820 in a direction generally away from the center axis 202.

The plate 820 divides the flow-through conduit 804 into a first flow-through conduit 804A and a second flow-through conduit 804B that is substantially equal in shape and size with the first flow-through conduit 804A between the first and second ends 806, 808. For example, the first and second flow-through conduits 804A, 804B may have substantially the same volume inside of the damper device 800. Optionally, the plate 820 may not be generally centered about the center axis 202 such that the first and second flow-through conduits 804A, 804B are not substantially equal in shape or size. Additionally or alternatively, the damper device 800 may include any number of plates 820 that may divide the flow-through conduit 804 into any number of divided flow-through conduits. The plate 820 has a first side 834 and an opposite second side 836. For example, the first side 834 faces the first flow-through conduit 804A, and the second side 836 faces towards the second flow-through conduit 804B.

The damper device 800 includes one or more exterior baffles 822 that are operably coupled with the inner surface 826 of the flow-through conduit 804. The baffles 822 protrude a distance away from the inner surface 826 of the flow-through conduit 804 and in a direction towards the center axis 202. In the illustrated embodiment, the exterior baffles 822 extend a distance away from the inner surface 826 in a direction generally perpendicular to the center axis 202. Optionally, one or more of the exterior baffles 822 may extend in any common or unique direction away from the inner surface 826. The first flow-through conduit 804A includes five exterior baffles 822A and the second flow-through conduit 804B includes eight exterior baffles 822B. Additionally or alternatively, the first or second flow-through conduits 804A, 804B may include any number of exterior baffles 822.

The plate 820 includes one or more interior baffles 832 that are operably coupled with the plate 820 and protrude a distance away from the plate 820 in a direction generally away from the plate 820. In the illustrated embodiment, the plate 820 includes four interior baffles 832A that are operably coupled with the first side 834 of the plate 820. The four interior baffles 832A extend a common distance away from the first side 834 of the plate 820 and protrude into the first flow-through conduit 804A. Additionally, in the illustrated embodiment, the plate 820 includes seven interior baffles 832B that are operably coupled with the second side 836 of the plate 820. The seven interior baffles 832B extend a common distance away from the second side 836 of the plate 820 and protrude into the second flow-through conduit 804B. Additionally or alternatively, any number of baffles 832 may extend away from the first or second sides 834, 836 of the plate 820 and protrude into the first or second flow-through conduits 804A, 804B. The interior baffles 832 extend away from the plate 820 in a direction substantially perpendicular to the center axis 202. Optionally, any number of baffles 832 may extend in any direction away from the plate 820.

The damper device 800 placed inside of the larger exterior conduit 54 divides the fluid into a first portion 812A and a second portion 812B. The first portion 812A flows through the first flow-through conduit 804A and along the flow path created by the interior and exterior baffles 832A, 822A that protrude into the first flow-through conduit 804A. The second portion 812B of the fluid flows through the second flow-through conduit 804B and along the flow path created by the interior and exterior baffles 832B, 822B that protrude into the second flow-through conduit 804B.

In the illustrated embodiment, the second flow-through conduit 804B includes more interior and exterior baffles 832B, 822A than the first flow-through conduit 804A. For example, the second flow-through conduit 804B is shaped and sized in order to create a longer flow path for the second portion 812B of the fluid to flow from the first end 806 to the second end 808 relative to the flow path created by the first flow-through conduit 804A. Additionally or alternatively, the first and second flow-through conduits 804A, 804B may include a common number of interior and/or exterior baffles 832, 822 such that the first and second flow-through conduits 804A, 804B create a substantially common flow path for the first and second portions 812A, 812B of the fluid to flow.

FIGS. 2 through 8 illustrate six embodiments of inline fluid damper devices.

Additionally or alternatively, one or more features or components of the damper devices illustrated in FIGS. 2 through 8 may be combined in any combination, configuration, or the like. Optionally, an inline damper device may have any alternative shape, size, configuration, or the like, of one or more flow-through conduits, one or more indirect flow conduits, one or more portions of fluid flowing along one or more flow paths, or the like. In one embodiment, a dampening system is provided that includes any two or more of the damper devices described herein (the same or different embodiments of the devices) disposed back-to-back or otherwise in a serial relationship such that fuel or other fluids sequentially flow through the multiple damper devices between a fluid reservoir and a load (e.g., an engine).

Figure 9:
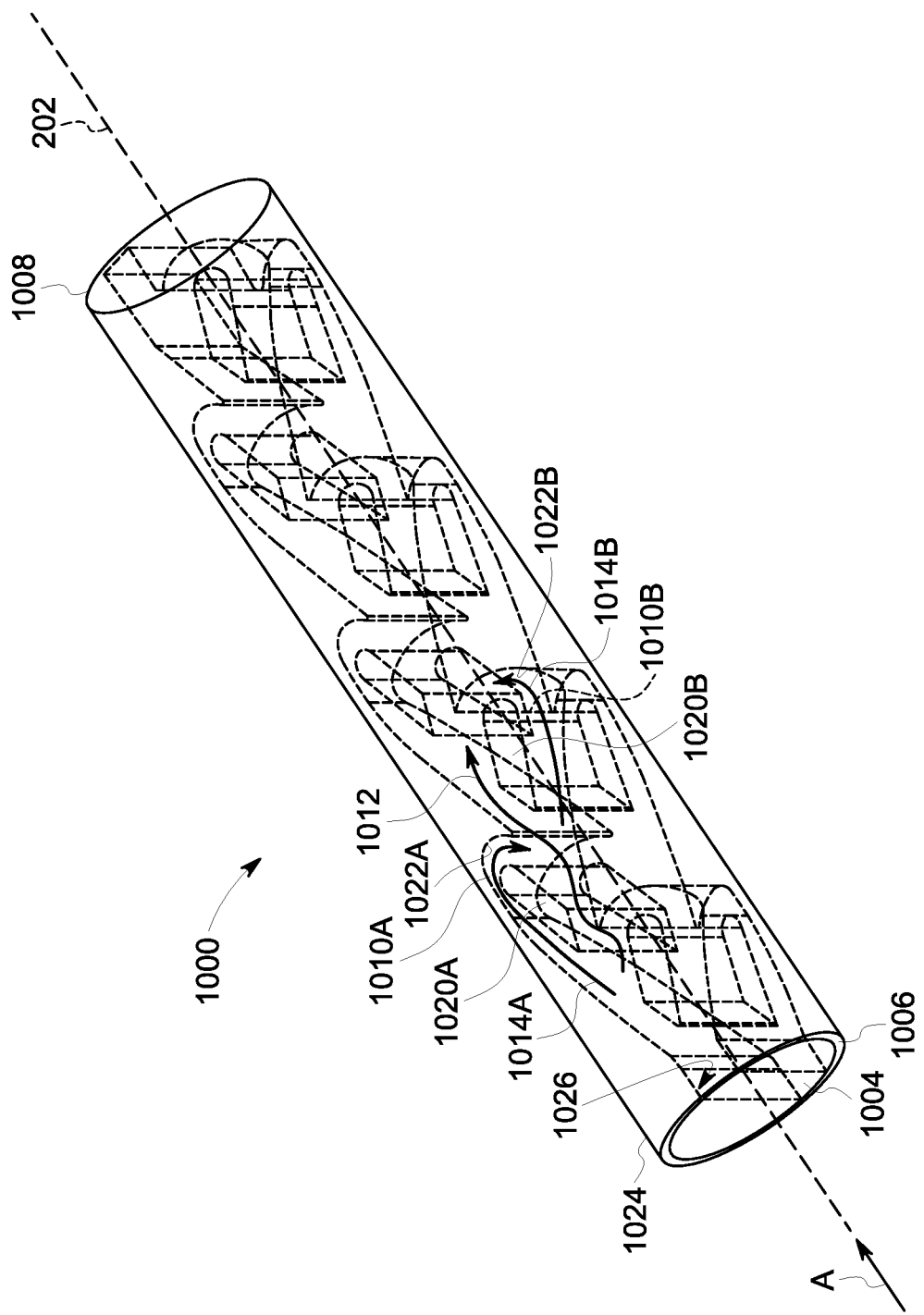
FIG. 9 illustrates a translucent perspective view of an inline fluid damper device in accordance with one embodiment.

FIG. 9 is a translucent perspective view of an inline fluid damper device 1000 in accordance with one embodiment. The damper device 1000 includes interior conduits 1004, 1010A, 1010B. The interior conduit 1004 may be referred to herein as a flow-through conduit 1004, the interior conduit 1010A may be referred to herein as a first indirect flow conduit 1010A, and the interior conduit 1010B may be referred to herein as a second indirect flow conduit 1010B. The flow-through conduit 1004 is elongated along the center axis 202 between first and second ends 1006, 1008. The flow-through conduit 1004 includes an inner surface 1026 and an outer surface 1024.

The first and second indirect flow conduits 1010A, 1010B include one or more closed loops 1022 that radially protrude from the flow-through conduit 1004 in a direction away from the center axis 202. Each of the closed loops 1022 includes a loop baffle 1020 that is disposed inside of each of the closed loops 1022. For example, the loop baffles 1020 separate the closed loops 1022 of the first and second indirect flow conduits 1010A, 1010B from the flow-through conduit 1004.

In the illustrated embodiment, the first indirect flow conduit 1010A includes three closed loops 1022A that radially protrude from the flow-through conduit 1004 on a first side of the center axis 202, and the second indirect flow conduit 1010B includes four closed loops 1022B that radially protrude from the flow-through conduit 1004 on an opposite, second side of the center axis 202. Additionally or alternatively, the damper device 1000 may include any number of indirect flow conduits 1010 that may include any number of closed loops 1022 that may protrude from any side of the center axis 202.

The closed loops 1022A, 1022B are arranged in an alternating configuration along the length of the damper device 1000 between the first and second ends 1006, 1008. Optionally, the first and second indirect flow conduits 1010A, 1010B may include any common or unique number of closed loops 1022. Additionally or alternatively, the closed loops 1022 of the first and second indirect flow conduits 1010A, 1010B may be arranged in any alternating, random, patterned, continuous configuration, or the like, between the first and second ends 1006, 1008. For example, the first indirect flow conduit 1010A may include one or more closed loops 1022A that may protrude from the flow-through conduit 1004 on the first side of the center axis 202, and the second indirect flow conduit 1010B may not include any closed loops 1022B that protrude from the flow-through conduit 1004. Optionally, the closed loops 1022 and the first and second indirect flow conduits 1010A, 1010B may have any alternative configuration.

The damper device 1000 placed inside of the larger exterior conduit 54 divides the fluid flowing in the direction A into a first portion 1012, a second portion 1014A, and a third portion 1014B. The first portion 1012 of the fluid flows through the flow-through conduit 1004 from the first end 1006 to the second end 1008. The second portion 1014A of the fluid flows through the first indirect flow conduit 1010A and around the closed loops 1022A of the first indirect flow conduit 1010A. The third portion 1014B of the fluid flows through the second indirect flow conduit 1010B and around the closed loops 1022B of the second indirect flow conduit 1010B. For example, the loop baffles 1020A of the first indirect flow conduit 1010A directs the flow of the second portion 1014A of the fluid around the loop baffles 1020A and around the closed loops 1022A. Additionally, the loop baffles 1020B of the second indirect flow conduit 1010B directs the flow of the third portion 1014B of the fluid around the loops baffles 1020B and around the closed loops 1022B.

The closed loops 1022A, 1022B of the first and second indirect flow conduits 1010A, 1010B create a longer flow path for the second portion 1014A and the third portion 1014B of the fluid to flow from the first end 1006 to the second end 1008 relative to the flow path created by the flow-through conduit 1004. For example, the first portion 1012 of the fluid that flows through the flow path created by the flow-through conduit 1004 flows from the first end 1006 to the second end 1008 more quickly (e.g., in a shorter amount of time) than the second and third portions 1014A, 1014B of the fluid that flow through the flow paths created by the first and second indirect flow conduits 1010A, 1010B, respectively.

Figure 10A:
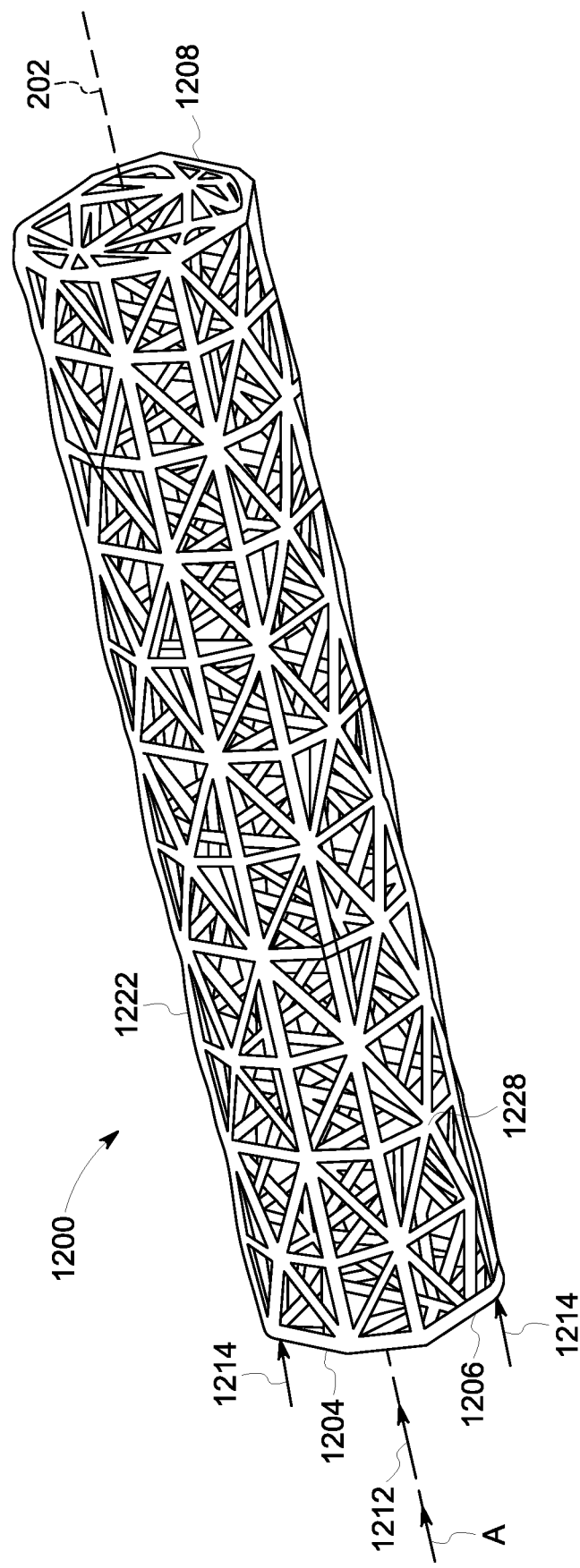
FIG. 10A illustrates a perspective view of an inline fluid damper device in accordance with one embodiment.
Figure 10B:
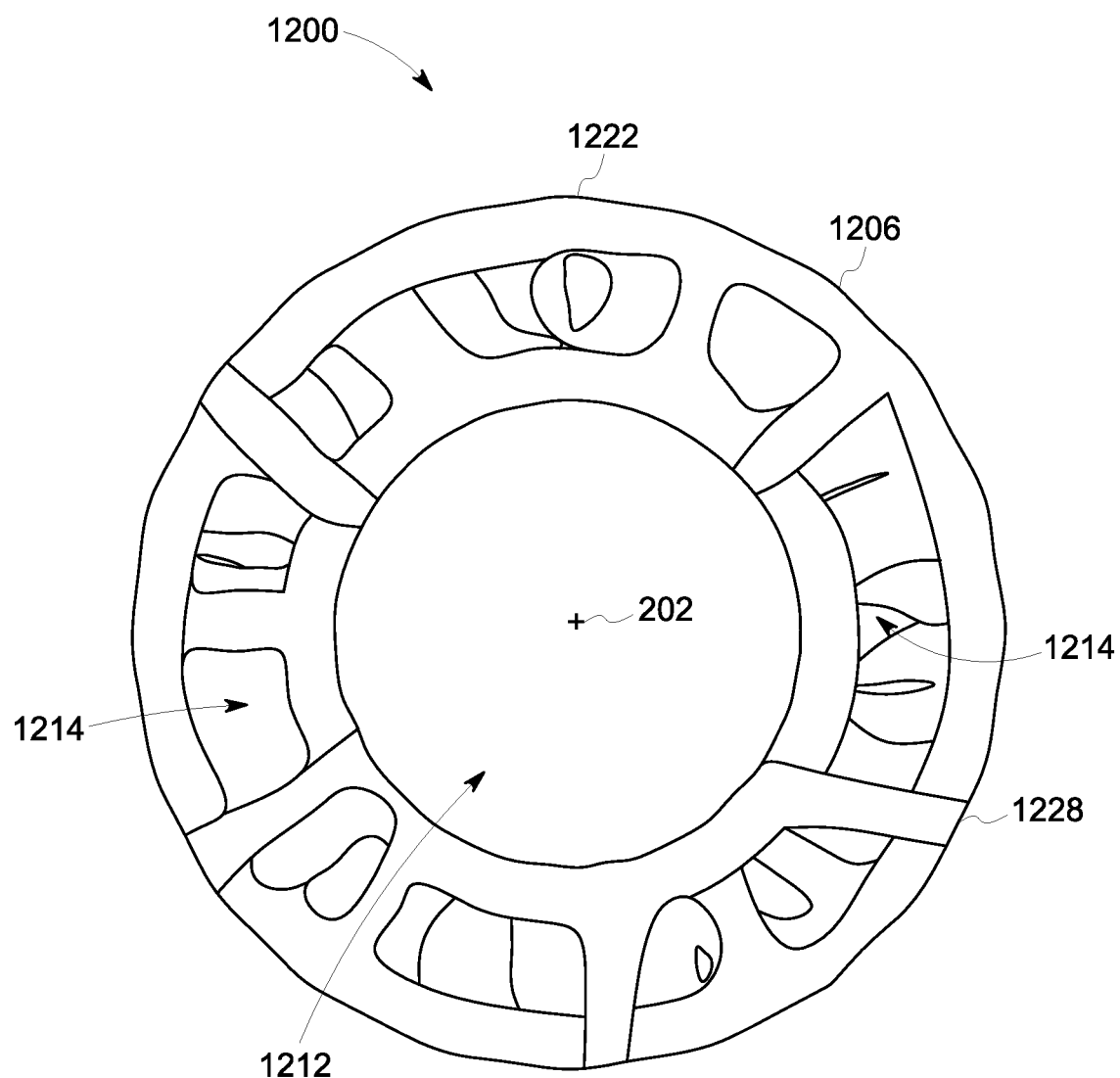
FIG. 10B illustrates a front view of the inline fluid damper device of FIG. 10A in accordance with one embodiment.

FIG. 10A illustrates a perspective view of an inline fluid damper device 1200 in accordance with one embodiment. FIG. 10B illustrates a front view of the inline fluid damper device 1200. FIGS. 10A and 10B will be discussed together in detail.

The inline fluid damper device 1200 includes plural elongated stems 1222 that are coupled with each other at plural nodes 1228. The damper device 1200 may be formed as a unitary damper device and/or as a multiple component damper device. For example, the damper device 1200 may be cast as a single, unitary, monolithic device including plural stems that are cast or formed together. Optionally, the stems may be welded, adhered, clipped, fastened, or the like, with each other at the nodes 1228. Optionally, at least part of the damper device 1200 may be formed as a unitary damper device and one or more stems 1222 may be operably coupled with the at least part unitary damper device. In the illustrated embodiment, the stems 1222 are arranged in a repeating lattice pattern. For example, the stems 1222 are substantially uniform in shape and size and are arranged such that the stems 1222 form plural cells that are substantially uniformly spaced apart between the stems 1222. Optionally, the damper device 1200 may include any number of stems 1222 that may be arranged in any random and/or patterned configuration along the length of the damper device 1200. For example, the damper device 1200 may include any number of stems 1222 of any unique and/or uniform shape and/or size that may be arranged in order to form any unique and/or uniform size of cells between the stems 1222.

The plural stems 1222 coupled with each other at the plural nodes 1228 forms a flow-through conduit 1204. The flow-through conduit 1204 is elongated along and substantially centered about the center axis 202. The flow-through conduit 1204 extends between a first end 1206 and a second end 1208. In the illustrated embodiment, the stems 1222 and nodes 1228 are shaped, sized, and arranged such that the flow-through conduit 1204 is generally centered about the center axis 202. Additionally or alternatively, the stems 1222 and nodes 1228 may be arranged in any alternative configuration such that the flow-through conduit 1204 may not be substantially centered about the center axis 202.

The damper device 1200 placed inside of the larger exterior conduit 54 divides the fluid flowing in the direction A such that at least some of the fluid flows through the flow-through conduit 1204 without contacting any stems 1222 and/or nodes 1228 and at least some of the fluid concurrently flows through the flow-through conduit 1204 and contacts one or more of the stems 1222 and/or nodes 1228. For example, at least some of the fluid flows in a direction 1212 along the center axis 202 and through the flow-through conduit 1204 such that the fluid that flows in the direction 1212 does not contact, touch, interact with, or the like, with any of the stems 1222 and/or nodes 1228. Additionally, at least some of the fluid flows in a direction 1214 such that the fluid that flows in the direction 1214 does contact, touch, interact with, or the like, one or more of the stems 1222 and/or one or more of the nodes 1228. The stems 1222 coupled at the nodes 1228 create a flow path for the fluid that is flowing in the direction 1214 (e.g., the fluid that contacts the stems 1222 and nodes 1228) that is longer relative to a flow path created by the stems 1222 and nodes 1228 for the fluid that is flowing in the direction 1212 (e.g., the fluid that does not contact the stems 1222 or nodes 1228). For example, the one or more stems 1222 and/or the one or more nodes 1228 may create or increase frictional drag as the fluid flows along the flow path in the direction 1214 and contacts the stems 1222 and/or nodes 1228 relative to the at least some of the fluid that flows along the flow path that does not contact the stems 1222 and/or nodes 1228 (e.g., the fluid that flows in the direction 1212).

Figure 11A:
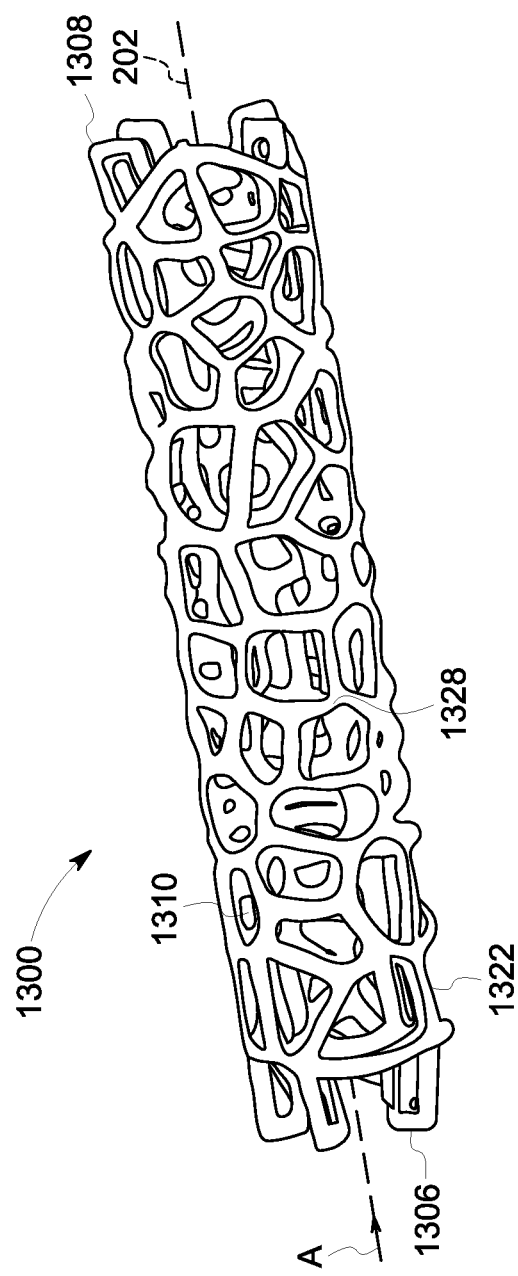
FIG. 11A illustrates a perspective view of an inline fluid damper device in accordance with one embodiment.
Figure 11B:
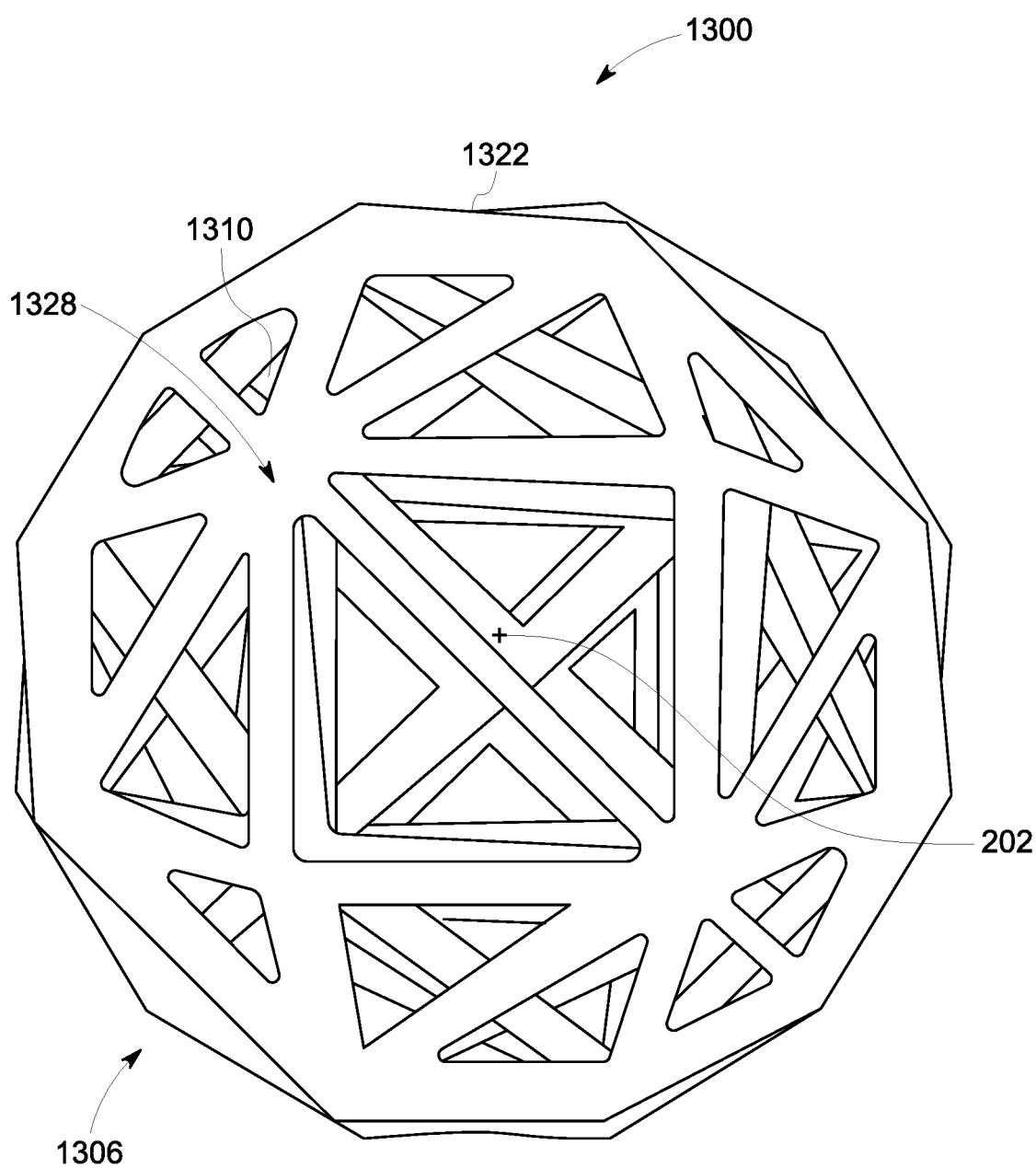
FIG. 11B illustrates a front view of the inline fluid damper device of FIG. 11A in accordance with one embodiment.

FIG. 11A illustrates a perspective view of an inline fluid damper device 1300 in accordance with one embodiment. FIG. 11B illustrates a front view of the inline fluid damper device 1300. FIGS. 11A and 11B will be discussed together in detail.

The damper device 1300 includes plural elongated stems 1322 that are coupled with each other at plural nodes 1328. The damper device 1300 may be formed as a unitary damper device and/or as a multiple component damper device. For example, the damper device 1300 may be cast as a single, unitary, monolithic device including plural stems that are cast or formed together. Optionally, the stems 1322 may be welded, adhered, clipped, fastened, or the like, with each other at the nodes 1328. Optionally, at least part of the damper device 1300 may be formed as a unitary damper device and one or more stems 1322 may be operably coupled with the at least part unitary damper device. In the illustrated embodiment, the stems 1322 are arranged in a random configuration. For example, the stems 1322 and nodes 1328 are arranged such that the stems 1322 form plural cells that are of random shape, random size, random distances apart, or the like, between the stems 1322. Optionally, the damper device 1322 may include any number of stems 1322 that are of any uniform or unique shape and/or size that may be arranged in order to form any uniform and/or unique size of cells between the stems 1322.

The plural stems 1322 coupled with each other at the plural nodes 1328 forms an indirect flow conduit 1310. The indirect flow conduit 1310 is elongated along and substantially centered about the center axis 202. The indirect flow conduit 1310 extends between a first end 1306 and a second end 1308 along the center axis 202. In the illustrated embodiment, the stems 1322 and nodes 1328 are arranged such that one or more of the stems 1322 and one or more of the nodes 1328 intersect with the indirect flow conduit 1310 along the center axis 202. For example, one or more of the stems 1322 protrude distances away from the nodes 1328 such that one or more stems 1322 extend in one or more directions that may be substantially parallel to, may be substantially perpendicular to, may be non-parallel with, may be non-perpendicular with, or the like, the center axis 202. For example, one or more stems 1322 or nodes 1328 may intersect with the center axis 202 at one or more locations along the center axis 202 between the first end 1306 and the second end 1308.

The damper device 1300 placed inside of the larger exterior conduit 54 divides the fluid flowing in the direction A such that the fluid flows through the indirect flow conduit 1310 and contacts one or more of the stems 1322 and/or nodes 1328. For example, at least some of the fluid flows from the first end 1306 to the second end 1308 and contacts, touches, interacts with, or the like, one or more of the stems 1322 and/or one or more of the nodes 1328. The stems 1322 coupled with each other at the nodes 1328 creates plural flow paths for the fluid that is flowing in the direction A such that the fluid may contact, touch, interact with, or the like, one or more stems 1322 and/or one or more nodes 1328 as the fluid flows from the first end 1306 to the second end 1308.

Figure 12:
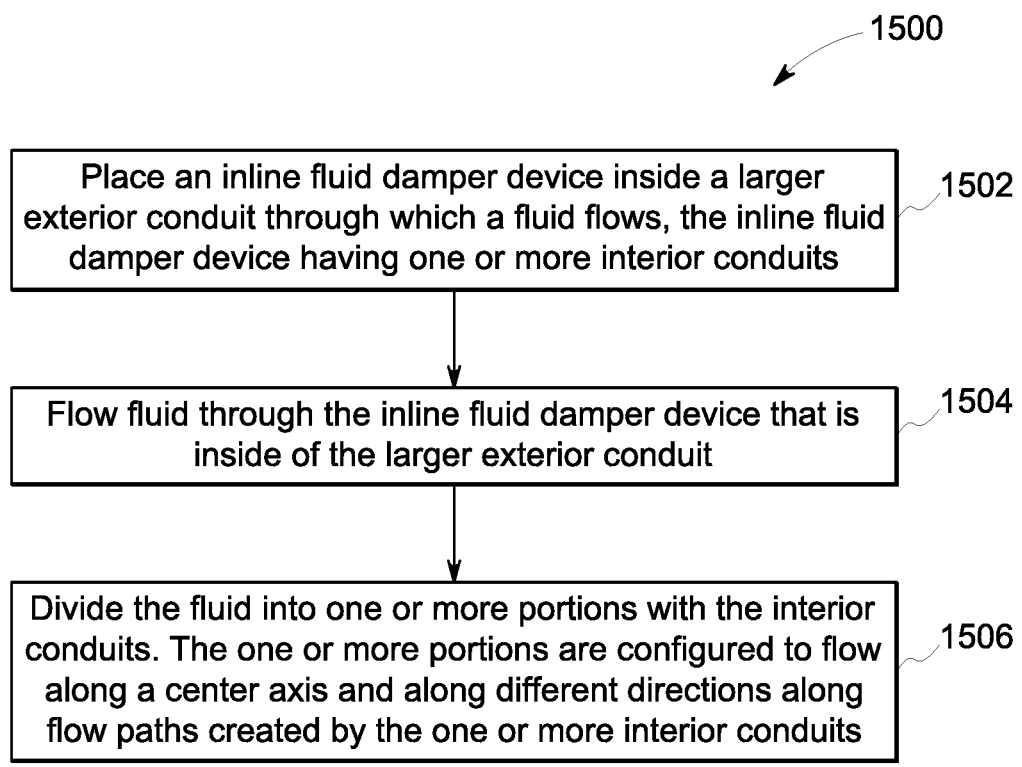
FIG. 12 illustrates a flowchart of a method in accordance with one embodiment.

FIG. 12 illustrates a flowchart 1500 of a method in accordance with one embodiment. At 1502, an inline fluid damper device is placed inside of a larger exterior conduit through which a fluid is configured to flow. The damper device includes one or more interior conduits. The interior conduits may be elongated along and may extend around a center axis. For example, the damper device may include one or more flow-through conduits, one or more indirect flow conduits, a combination of one or more flow-through conduits and one or more indirect flow conduits, or the like. Optionally, the interior conduits may include one or more spiral protrusions, one or more closed loops, one or more baffles, one or more stems coupled with each other at one or more nodes, or any combination that may include any number of spiral protrusions, closed loops, baffles, stems, or the like. Additionally or alternatively, the interior conduits may have any alternative shape, size, orientation, or the like, that may divide the fluid that flows through the larger exterior conduit such that the fluid may flow the length of the damper device along any direction of a flow path created by the interior conduits.

At 1504, the fluid flows through the inline fluid damper device that is disposed inside of the larger exterior conduit. For example, the fluid may be fuel that flows through a fuel line to a gas turbine engine assembly. Optionally, the fluid may be a coolant that flows to a mechanical system, the fluid may be fuel that flows to any alternative mechanical system, the fluid may be any fluid that is removed from any mechanical system, or the like. The fluid flows through the larger exterior conduit and through the damper device, for example from a first end to a second end of the damper device. Additionally or alternatively, fluid may flow from the second end to the first end of the damper device. For example, fuel may be removed from the gas turbine engine assembly. Optionally, the larger exterior conduit may be any conduit operably coupled with any assembly through which a fluid may flow.

At 1506, the one or more interior conduits of the damper device divides the fluid that flows through the damper device into one or more portions. For example, the damper device may include a single interior conduit, and the fluid may flow along a flow path created by the interior conduit. Optionally, the damper device may include two or more interior conduits. For example, the damper device may include a flow-through conduit (e.g., the flow-through conduit 204 of FIG. 2) and two indirect flow conduits (e.g., the indirect flow conduits 510 of FIG. 5). The fluid may be divided into three portions such that a first portion may flow along a first flow path created by the flow-through conduit, a second portion may flow along a second flow path created by the first indirect flow conduit that is different from the first flow path, and a third portion may flow along a third flow path created by the second indirect flow conduit that is different from the first and second flow paths. Optionally, the fluid may be divided into any number of portions having substantially similar or substantially different volumes of the fluid. Additionally or alternatively, one or more of the interior conduits may be shaped and/or sized in order to create one or more flow paths having substantially similar flow paths.

In one embodiment of the subject matter described herein, an inline fluid damper device includes a flow-through conduit configured to be placed inside a larger exterior conduit through which a fluid flows. The flow-through conduit is elongated and extends around a center axis. The damper device also includes an indirect flow conduit coupled with the flow-through conduit. The indirect flow conduit is also configured to be placed inside the larger exterior conduit. The flow-through conduit and the indirect flow conduit are configured to dampen one or more flow fluctuations or pressure fluctuations in the fluid flowing in the larger exterior conduit by dividing the fluid into a first portion that flows along the center axis through the flow-through conduit and a second portion that concurrently flows outside of the flow-through conduit along the center axis and along a different direction.

Optionally, the flow-through conduit is also configured to extend from a first end to a second end. The indirect flow conduit creates a longer flow path for the second portion of the fluid to flow from the first end to the second end relative to a flow path created by the flow-through conduit for the first portion of the fluid to flow from the first end to the second end.

Optionally, the indirect flow conduit includes a spiral protrusion helically wrapped around the flow-through conduit and radially protruding from the flow-through conduit away from the center axis.

Optionally, the spiral protrusion that radially protrudes from the flow-through conduit is configured to extend from the flow-through conduit to an inner surface of the larger exterior conduit.

Optionally, the spiral protrusion is configured to be helically wrapped around the flow-through conduit at least partially between a first end and a second end of the flow-through conduit along the center axis.

Optionally, the spiral protrusion is configured to create a flow path for the second portion of the fluid to flow helically along the spiral protrusion between a first end and a second end of the flow-through conduit.

Optionally, the indirect flow conduit includes one or more closed loops radially protruding from the flow-through conduit on opposite sides of the center axis.

Optionally, the one or more closed loops creates a longer flow path for the second portion of the fluid to flow from the first end to the second end relative to a flow path created by the flow-through conduit for the first portion of the fluid to flow from the first end to the second end.

Optionally, the one or more closed loops that radially protrude from the flow-through conduit are configured to create a flow path for the second portion of the fluid to flow around the one or more closed loops between a first end and a second end of the flow-through conduit.

In one embodiment of the subject matter described herein, an inline fluid damper device includes plural elongated stems that couple with each other at plural nodes. The stems form an elongated flow-through conduit extending around a center axis. The flow-through conduit is configured to be placed inside a larger exterior conduit through which a fluid flows. The stems are configured to dampen one or more of flow fluctuations or pressure fluctuations in the fluid flowing in the larger exterior conduit by dividing the fluid such that at least some of the fluid flows through the flow-through conduit without contacting the stems and at least some of the fluid concurrently flows through the flow-through conduit and contacts the stems.

Optionally, the stems are configured to extend from the flow-through conduit to an inner surface of the larger exterior conduit.

Optionally, the stems are configured to protrude from the plural nodes in a direction towards the center axis.

Optionally, the plural stems are configured to form a lattice extending around the center axis between a first end and a second end of the flow-through conduit.

In one embodiment of the subject matter described herein, an inline fluid damper device includes a flow-through conduit configured to be placed inside a larger exterior conduit through which a fluid flows. The flow-through conduit is elongated and extends around a center axis. The damper device also includes an indirect flow conduit coupled with the flow-through conduit. The indirect flow conduit is also configured to be placed inside the larger exterior conduit. The flow-through conduit and the indirect flow conduit are configured to dampen one or more flow fluctuations or pressure fluctuations in the fluid flowing in the larger exterior conduit by dividing the fluid into a first portion that flows along the center axis through the flow-through conduit and a second portion that concurrently flows outside of the flow-through conduit along the center axis and along a different direction. The flow-through conduit is configured to extend from a first end to a second end. The indirect flow conduit creates a longer flow path for the second portion of the fluid to flow from the first end to the second end relative to a flow path created by the flow-through conduit for the first portion of the fluid to flow from the first end to the second end.

Optionally, the indirect flow conduit includes a spiral protrusion helically wrapped around the flow-through conduit and radially protruding from the flow-through conduit away from the center axis.

Optionally, the spiral protrusion is configured to be helically wrapped around the flow-through conduit at least partially between a first end and a second end of the flow-through conduit along the center axis.

Optionally, the spiral protrusion is configured to create a flow path for the second portion of the fluid to flow helically along the spiral protrusion between a first end and a second end of the flow-through conduit.

Optionally, the spiral protrusion that radially protrudes from the flow-through conduit is configured to extend from the flow-through conduit to an inner surface of the larger exterior conduit.

Optionally, the indirect flow conduit includes one or more closed loops radially protruding from the flow-through conduit on opposite sides of the center axis.

Optionally, the one or more closed loops creates a longer flow path for the second portion of the fluid to flow from the first end to the second end relative to a flow path created by the flow-through conduit for the first portion of the fluid to flow from the first end to the second end.

As used herein, an element or step recited in the singular and proceeded with the word "a" or "an" should be understood as not excluding plural of said elements or steps, unless such exclusion is explicitly stated. Furthermore, references to "one embodiment" of the presently described subject matter are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are exemplary embodiments. Many other embodiments will be apparent to those of skill in the art upon reviewing the above description. The scope of the subject matter described herein should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. An inline fluid damper device comprising,
an elongated flow-through conduit that extends around a center axis, the flow-through conduit comprising an inner surface and an inner spiral protrusion that is coupled with the inner surface and extends toward the center axis;
an indirect flow conduit coupled with the flow-through conduit, the flow-through conduit and the indirect flow conduit configured to be formed as a unitary structure that is separate from a larger exterior conduit and that is configured to be placed at one or more different positions inside the larger exterior conduit through which a fluid flows; and
a rod disposed within the flow-through conduit that extends along the center axis, the inner spiral protrusion extending from the inner surface of the flow-through conduit to the rod,
wherein the flow-through conduit and the indirect flow conduit are configured to dampen one or more flow fluctuations or pressure fluctuations in the fluid flowing in the larger exterior conduit by dividing the fluid into a first portion that flows along a flow path formed by the inner spiral protrusion of the flow-through conduit and a second portion that concurrently flows outside of the flow-through conduit along the center axis; and
wherein the rod is an open passage between a first end and a second end of the flow-through conduit.

2. An inline fluid damper device comprising,
an elongated flow-through conduit that is elongated along and extends around a center axis, the flow-through conduit comprising an inner surface and an inner spiral protrusion that is coupled with the inner surface and extends toward the center axis;
an indirect flow conduit coupled with and disposed outside of the flow-through conduit, the flow-through conduit and the indirect flow conduit configured to be formed as a unitary structure that is separate from a larger exterior conduit and that is configured to be placed at one or more different positions inside the larger exterior conduit through which a fluid flows; and
a rod disposed within the flow-through conduit that extends along the center axis, the inner spiral protrusion extending from the inner surface of the flow-through conduit to the rod,
wherein the flow-through conduit and the indirect flow conduit are configured to dampen one or more of flow fluctuations or pressure fluctuations in the fluid flowing in the larger exterior conduit by dividing the fluid into a first portion that flows along a flow path formed by the inner spiral protrusion of the flow-through conduit and a second portion that concurrently flows outside of the flow-through conduit along the center axis, and
wherein the flow-through conduit is configured to extend from a first end to a second end, the indirect flow conduit creates a longer flow path for the second portion of the fluid to flow from the first end to the second end relative to a flow path created by the flow-through conduit for the first portion of the fluid to flow from the first end to the second end, and
wherein the rod is an open passage between a first end and a second end of the flow-through conduit.

* * * * *